(12) United States Patent
Scoville et al.

(10) Patent No.: US 6,756,069 B2
(45) Date of Patent: Jun. 29, 2004

(54) SYSTEM AND METHOD FOR DISPENSING A LIQUID BEVERAGE CONCENTRATE

(75) Inventors: Eugene Scoville, New Milford, CT (US); Pu-Sheng Cheng, Dublin, OH (US); Randall C. Chrisman, Southbury, CT (US); Shannon Gavie, Altadena, CA (US); Walter F. Landry, Kent, CT (US); Brian J. McDonough, Escondido, CA (US); Randall L. Morrison, Sylmar, CA (US)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/768,784

(22) Filed: Jan. 25, 2001

(65) Prior Publication Data

US 2001/0026821 A1 Oct. 4, 2001

Related U.S. Application Data

(63) Continuation-in-part of application No. 09/453,932, filed on May 16, 2000, now Pat. No. 6,319,537.
(60) Provisional application No. 60/134,460, filed on May 17, 1999.

(51) Int. Cl.[7] .............................. A23F 5/00; B65D 85/72
(52) U.S. Cl. ....................... 426/594; 426/386; 426/387; 426/388; 426/119; 426/392
(58) Field of Search ................................. 426/594, 386, 426/387, 388, 119, 392

(56) References Cited

U.S. PATENT DOCUMENTS

| | | | |
|---|---|---|---|
| 3,438,551 A | 4/1969 | Belisle | 222/182 |
| 3,558,020 A | 1/1971 | Russell | 222/416 |
| 3,643,835 A | 2/1972 | Popinski | 222/56 |
| 3,727,799 A | 4/1973 | Nixon | 222/129.4 |
| 3,810,999 A | 5/1974 | Balling et al. | 426/362 |
| 4,008,340 A | 2/1977 | Kung et al. | 426/651 |
| 4,316,557 A | 2/1982 | Benoun et al. | 222/129 |
| 5,087,469 A | 2/1992 | Acree | 426/544 |
| 5,182,926 A | 2/1993 | Carns et al. | 62/352 |
| 5,346,097 A * | 9/1994 | Melland et al. | |
| 5,384,143 A | 1/1995 | Koyama et al. | 426/546 |
| 5,688,545 A | 11/1997 | Sanders et al. | 426/120 |
| 5,797,519 A | 8/1998 | Schroeder et al. | |
| 5,848,732 A | 12/1998 | Brugger | |
| 5,897,703 A | 4/1999 | Hatakeyama et al. | 106/696 |
| 5,971,210 A | 10/1999 | Brugger | |
| 5,997,929 A | 12/1999 | Heeb et al. | 426/433 |

FOREIGN PATENT DOCUMENTS

| | | | |
|---|---|---|---|
| DE | 3220693 | * | 8/1983 |
| EP | 0 489 401 | | 6/1992 |
| EP | 0 861 596 | | 9/1998 |
| EP | 0 893 065 | | 1/1999 |
| EP | 0 934 702 | | 8/1999 |
| GB | 2 057894 | | 4/1981 |

* cited by examiner

*Primary Examiner*—Anthony J. Weier
(74) *Attorney, Agent, or Firm*—Winston & Strawn LLP

(57) ABSTRACT

The present invention is related to a device and method for dispensing dual component liquids or concentrates packaged in separate containers to provide protection from effects such as oxidation and moisture loss. The liquids or concentrates can be dispensed through a pumping system, preferably including a peristaltic pump, mixed together, and optionally diluted with another liquid, such as water, to provide a consumable beverage. In addition, the device of the present invention can dispense liquids or concentrates having different viscosities, such that they are mixed together in the proper ratio.

20 Claims, 2 Drawing Sheets

SYSTEM AND METHOD FOR DISPENSING A LIQUID BEVERAGE CONCENTRATE

CROSS-REFERENCE TO RELATED APPLICATION

This application is a continuation-in-part of U.S. patent application Ser. No. 09/453,932, filed on May 16, 2000, now U.S. Pat. No. 6,319,537 which claims the benefit of provisional application No. 60/134,460 May 17, 1999.

FIELD OF THE INVENTION

The present invention is related to a device and method for dispensing dual component liquids or concentrates packaged in separate compartments or containers. The liquids or concentrates can be mixed together, optionally diluted with another liquid, such as water, and then dispensed through a pumping system, to provide a consumable beverage.

BACKGROUND OF THE INVENTION

Containers used in the packaging art for storing and dispensing liquids generally include a sealed polymeric bag or pouch. There are a variety of pouches known in the art, particularly for storing liquids or concentrates.

U.S. Pat. No. 4,523,697 to Jeans discloses a container for dispensing a concentrate at a predetermined flow rate. The container also includes two mating assemblies, mating at an outlet valve, and a tube in its interior to permit controlled pressurization to the volume in the container.

U.S. Pat. No. 4,709,835 to Krüger et al. discloses a disposable pouch for beverage syrups and concentrates including a collapsible bag, a discharge spout, and an insert that can be broken off when a dosing valve assembly is attached. The pouch has utility in a postmix beverage dispenser.

U.S. Pat. No. 5,307,955 to Viegas discloses a flaccid-bottom, lightweight delivery package for dispensing fluid products. The package contains a self-sealing dispensing valve and is particularly useful for storing and dispensing viscous fluid materials.

Additionally, it may be useful to mix two liquid or concentrate components together, especially to create a beverage for consumption. This mixing may occur during storage or upon dispensing. The two liquids or concentrates can be simply placed together after dispensation, dispensed together without added mixing, or dispensed together with intimate mixing. For example, U.S. Pat. Nos. 4,204,775 and 4,316,673 to Speer each disclose a mixing device that uses a tortuous path to shear, fold, mix, and blend together a two-part fluid compound.

Beverages made from individual components are generally mixed together and dispensed by a dispensing system. Dispensing systems may be manual or automatic and may operate continuously or in discrete dispensation steps. Liquid dispensation systems typically involve at least a liquid receptacle for holding the liquid and a pump for dispensing the liquid into a consumable portion. A variety of liquid dispensing systems are commercially available and disclosed in the prior art.

U.S. Pat. Nos. 4,306,667; 4,359,432; and 4,376,496, as well as U.S. Reissue Pat. No. RE 32,179 all to Sedam et al., disclose a post-mix carbonated beverage dispensing system for used in refrigerated cabinets. The dispensing system contains a carbonator with a refillable water reservoir, a $CO_2$ system, a valving system, and a disposable package for containing and dispensing the post-mix beverage syrup.

U.S. Pat. No. 4,564,127 to Garabedian et al. discloses a liquid dispenser system containing a collapsible bag with a self-sealing valve and clips to engage the dispenser, clip-receiving structures to engage the bag clips and open or close the valve, a pump, support for the bag, and a frame.

U.S. Pat. No. 4,901,886 to Kirschner discloses a post-mix juice dispensing system including a bag-in-tank system for reconstituting and dispensing a juice concentrate at freezer temperatures. The bag-in-tank system includes a pressurizable canister with a slidable carrier capable of forcing concentrate out of a flexible bag under pressure and placed therein.

U.S. Pat. No. 5,368,195 to Pleet et al. discloses a pressurized bag-in-bottle fluid dispenser system for accurately delivering a viscous or semi-viscous liquid. The dispenser system is particularly suited for dispensing condiments, paints, pigments, or adhesives and includes a metering unit activated by a manually operated trigger on a gun.

U.S. Pat. Nos. 5,615,801 and 5,735,436 to Schroeder et al. disclose a disposable and recyclable juice concentrate package for a post-mix juice dispenser. The dispenser includes a pump that provides a continuous stream of concentrate, a package housing containing a container housing and a pump housing, and an integral mixing nozzle. It is suggested that the continuous streaming of the concentrate into the mixing chamber of the dispenser improves mixing.

U.S. Pat. No. 5,803,312 to Credle, Jr. et al. discloses a manually operated, postmix juice dispenser. This low cost dispenser is used with a disposable concentrate package and includes a water tank, a water pump, and a pump handle. The disposable concentrate package for use with this system is generally a flexible pouch with a built-in concentrate pump that connects to the handle.

In some circumstances, two liquids may be dispensed together by the same apparatus. A single apparatus that allows mixing of two liquids results in effectively a better mixed consumer beverage product. The two liquids can be dispensed, for example, using a dual liquid dispenser package, as disclosed in U.S. Pat. No. 4,774,057 to Uffenheimer et al. This patent discloses a dispenser package containing two separate liquid dispensing chambers, two liquid reservoirs, and liquid supply channels connecting the reservoirs to the chambers.

Coffee products, which are in a form convenient for the consumer, are commonly available as soluble beverage powders and ready-to-drink liquid beverages.

Coffee products in the form of soluble beverage powders may be of extremely high quality; to the point were they provide a beverage very similar to freshly brewed beverages. Despite this, they are still perceived as being inferior to freshly brewed coffee. Also, the fact that soluble beverage powders are in powder form creates problems in many food service applications where the product is dispensed from a machine. In particular, problems such as mechanical degradation of the powder, bridging, and blocking occur. Refilling of the dispensing device with powdered products may also require manual operation and cleaning and may cause loss of refill material in loading the machine's hopper.

Ready-to-drink liquid coffee beverages are very popular in Asian markets. The beverages are made up of soluble coffee solids, stabilizers, water and, usually, sugar. For whitened beverages, a creamer or whitener may be included. Ordinarily, these beverages have a soluble coffee solids concentration of about 1% by weight. These beverages are very often consumed cold and, in general, have organoleptic properties which are different than freshly brewed coffee.

Therefore they do not, and in fact are not intended to, provide a substitute to freshly brewed coffee.

There have also been attempts to provide convenient coffee products in fluid concentrate form. In theory, a coffee concentrate offers the advantages of being perceived to have better quality than soluble beverage powders, and being simple to apply in food service applications. Unfortunately, liquid coffee concentrates are unstable and this has severely limited their application. One problem appears to be the increase of acidity over time which negatively influences the quality of the beverage reconstituted from the coffee concentrate. Also, curdling of whitener or creamer components may occur.

Attempts have been made to avoid or reduce the acidity increase by adding base to the concentrate. For example, European Patent Application No. EP-0861596 describes treating a coffee concentrate with alkali to convert acid precursors to their acid salts, and then neutralizing the treated concentrate with acid to bring the pH to about 4.7 to 5.3. This process is described to convert the acid precursors to stable salts and hence prevent the formation of acid during storage.

Another possible method of avoiding or reducing the acidity increase in aromatized coffee concentrates is to increase concentration to above about 55%. This is described in European Patent Application No. EP-0893065.

When dispensing beverages including two or more fluids, it is desirable that the at least two fluids be stored apart and be easily mixed together and with other optional components using a single dispensation system. This can be advantageously accomplished with the aid of a multi-component packing assembly for separate storage of at least two fluid components together, allowing uniformity in packaging and dispensation system design and resulting in simplified shipping and implementation of dispensing a beverage from these at least two fluid components.

SUMMARY OF THE INVENTION

The invention relates to a dispensation system for providing a beverage product comprising a removable multi-component packing assembly configured and designed for storing at least two different components in separate compartments, wherein the components are capable of forming a beverage after being combined; an addition chamber operatively associated with the compartments of the packing assembly for receiving and combining the at least two components therein to form a mixture; and a pump assembly associated with the addition chamber for dispensing the mixture therefrom as a beverage product or beverage forming product.

Advantageously, the packing assembly has dual compartments for separately retaining the components therein during storage. The packing assembly may be a single chamber of a polymer film that is divided to form the two compartments. Alternatively, the packing assembly may contain at least two separate pouches that form the separate compartments and that are maintained together by a single outer container or chamber. Each compartment may include a fitment to separately dispense the components from the compartments. Also, the pump assembly comprises dual-head or multi-head volumetric positive displacement pumps, such as peristaltic pumps.

Another aspect of the invention relates to a method for dispensing a beverage product containing at least two different components. This method includes the steps of providing and retaining at least two different components in separate compartments of a single packaging outer chamber or container, wherein the components are capable of forming a beverage after being combined and the compartments contain relative amounts of each component such that the compartments empty uniformly relative to each other at a determined relative rate so as to become empty at about the same time; combining the at least two components by withdrawing them from the outer chamber and mixing them together, optionally with a diluent, to form a consumable beverage product; and dispensing the consumable beverage product for consumption by a consumer.

Another embodiment of the invention relates to a method for improving quality of a dispensed coffee beverage containing at least two different components, which method comprises providing and retaining at least two different components in separate compartments of a single outer chamber, wherein the components are capable of forming a coffee beverage after being combined; combining the at least two components by withdrawing them from the outer chamber and mixing them together, optionally with a diluent, to form a consumable beverage product; and dispensing the consumable beverage product for consumption by a consumer. Preferably, one component is a coffee base concentrate that is substantially free of coffee aroma, and another component is a coffee aroma.

Another embodiment of the invention relates to a beverage packaging assembly adapted for delivering at least two different components, each having a particular viscosity, optionally together with an additional diluent, to form a beverage. The adapted beverage assembly includes an outer chamber having at least two separate compartments for receiving and storing therein at least two different components, each compartment having a predetermined volume occupied by the component(s) therein; and a fitment attached to each of the compartments and having a predetermined orifice size, wherein the occupied volumes and orifice sizes of the compartments are varied, depending on the particular viscosities of the components therein, to provide the appropriate flow rates, and a desired ratio, of the components upon delivery and formation of the beverage, such that the compartments become empty at substantially the same time.

BRIEF DESCRIPTION OF THE DRAWINGS

The details of the preferred embodiments of the invention are illustrated in the appended drawing figures, wherein.

DETAILED DESCRIPTION OF THE PREFERRED EMBODIMENTS

Figure 1:
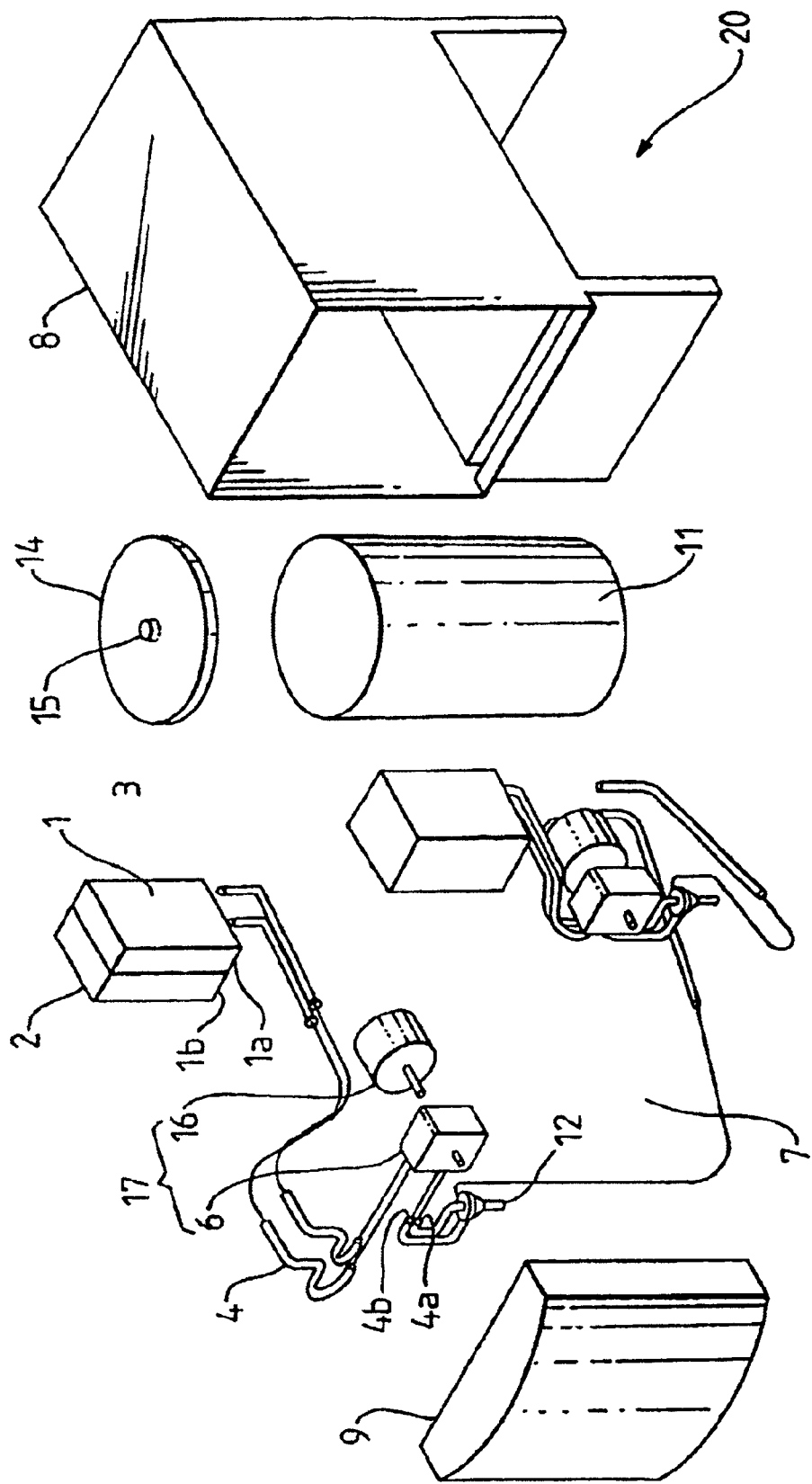
FIG. 1 shows an exploded schematic of the elements of a preferred dispensation system and how they fit together.

A suitable dispensation system according to the invention may be acquired commercially or may be fashioned by modifying an existing commercially available system in a way suitable to accommodate the necessary components described herein. Examples of suitable commercial systems or commercial systems readily modifiable by one of ordinary skill in the art include, for example, those manufactured by Karma, Inc., of Watertown, Wis., particularly Dispenser Model 670 or 672. Modification of one or more elements of commercial dispensation systems can vary depending upon many factors, for example, such as the (high) viscosity of one or more of the at least two components and/or a distinct difference in the viscosities of two of the components. Preferably, a volumetric positive displacement pump, such as a peristaltic pump, should be used and may be substituted for a different type of pump, if found in commercial dispensation systems. When two or more liquid components are used, the dispensation system may include a single-head pump for each liquid component or a smaller number of dual- or multi-head pumps. Exemplary commercial volumetric pumps for use with the invention include, but are not limited to, MityFlex peristaltic pumps, available from Anko Products, Inc., of Bradenton, Fla., and peristaltic or dispensing pumps commercially available from Watson-Marlow of Cheltenham, England.

Preferably, each of the at least two components may be packaged in its own pouch or bag, with each pouch or bag being stored in a separate compartment within a single outer chamber, for instance, in the form of a cardboard or other suitable box with a single compartment or chamber, with the at least two components being stored in a one-piece, dual compartment package, such that each compartment being connected to at least one other compartment by a suitable connection means. Alternately, the outer chamber may contain at least two chambers. Preferably, two or more pouches may be heatsealed together, or a single pouch separated into two or more chambers or cavities by a heatseal preferably extending from one end of the pouch to the other, to isolate the at least two components from each other while keeping their receptacles together.

In a preferred embodiment, the packaging assembly contains two or more, preferably two, webs of film that can be heatsealed to form two or more enclosures or pouches connected together in a row or in series. Preferably, the packaging assembly is capable of being folded at each heatseal. More preferably, the folds are alternating, such that each heatsealed end is folded back on itself, resulting in a zig-zag, or accordion, arrangement of the enclosures or pouches. Advantageously, the packaging assembly serves to keep separate the at least two components until they are dispensed.

In this way, through separation of the at least two components, it is believed that several advantages may be gained, for example, by avoiding certain shortcomings of products having components mixed prior to dosing, which disadvantages may include the following: one component may cause or accelerate the degradation or deterioration of another component, for example, during shipping or storage or within the dispensing apparatus or equipment, if the two components are mixed prior to dispensation; one component may "phase separate" from another component, for example, by settling, agglomerating, aggregating, solidifying, liquefying, forming a precipitate, forming another liquid phase, or in some other way causing an unevenly or non-uniformly mixed product to result, between the time the components are mixed together and the time the component mixture is dosed or dispensed; or both.

In another embodiment, each component enclosure or pouch, preferably of a packaging assembly, contains a dispensing fitment to allow each component to be dispensed. Each fitment may advantageously be connected to a gland in the dispensing system with any suitable connection system, i.e., gland and fitment, for example, commercial connectors, such as a Clean-Clic® fitment (i.e., as disclosed in Netherlands Patent No. NL 9400346 A or in International Publication No. WO 95/24972, the entire disclosure of which publications are hereby incorporated herein by reference hereto), commercially available from Innovative Packaging Netherlands, of Heemstede, The Netherlands, or a Scholle fitment, commercially available from Scholle Co., of Irvine, Calif. Preferably, the connection would possess, and the fitment would allow, a quick disconnect type function. In an alternative embodiment, the glands could be part of the packaging assembly and the fitments could be connected to the pump assembly with appropriate tubing.

The addition chamber may be any chamber, into which the at least two components may be pumped (and optionally into which a diluent may be pumped). Preferably, the chamber is suitable to allow the at least two components (and optionally the diluent) to come into contact or to allow their mixing before being dispensed as a consumable beverage. This addition of components in the chamber may result in intimate mixing, but intimate mixing is not required. The addition chamber advantageously serves as a contacting chamber for some or all of the components. In one embodiment, all the components (including the optional diluent) come into contact, or are mixed, in the addition chamber. In another embodiment, the at least two components come into contact, or are mixed, in the addition chamber, but the diluent is added later. In yet another embodiment, at least two of the components and/or diluent(s) initially come into contact, or are initially mixed, forming a component combination separate from the remaining components. In this embodiment, the initial contact or mixing may occur before, after, or in the addition chamber, with the remaining components being later brought into contact, or later being mixed, with the initial component combination.

The beverage product to be dispensed may include, but is not limited to, a coffee-type beverage, e.g., including coffee-based, coffee-flavored, or mocha-flavored beverages, or a mixture thereof; a carbonated beverage, e.g., such as soda, cola, flavored seltzer, or the like, or a mixture thereof; a juice beverage; another type of flavored beverage; a creamy beverage, e.g., including milk-based or non-dairy creamer-based fats or components; or a combination thereof. Preferably, the beverage product to be dispensed is a creamy and/or a coffee-type beverage.

The at least two components may be separately stored in separate containers, which are secured together, or may alternately be stored separately in separate compartments of a single container. The containers are preferably dispenser containers. In one embodiment, the at least two separate components may be a coffee base concentrate and a coffee aroma. In another embodiment, the at least two separate components may be a heavy liquor and a distillate.

The flow rate at which each compartment is emptied should be uniform and may depend upon various inherent and design characteristics, for example, such as product viscosity, compartment capacity, fitment size, and the like. Uniform emptying is important to prevent waste or improper beverage preparation. For example, if the aroma component compartment is emptied before the coffee concentrate component, then the resulting coffee will probably have an undesirable taste in the absence of aroma.

The viscosities of the different components may vary greatly, depending on, among other things, the nature of the resulting beverage and the storage or usage temperature, but all preferably fall within the range of about 0.1 cPs to 10,000 cPs. In one embodiment where two components with different viscosities are present, the ratio of the larger to the smaller viscosity is from about 200 to 5,000, preferably from about 500 to 2,000, more preferably about 1,000. In a preferred embodiment, two components are present and preferably have viscosities from about 0.1 cPs to 10 cPs and from about 200 cPs to 10,000 cPs, respectively, more preferably from about 0.5 cPs to 2 cPs and from about 500 cPs to 7,500 cPs, respectively, most preferably of about 1 cPs and from about 1,000 cPs to 5,000 cPs, respectively.

The compartment capacities of each compartment of the packaging assembly and the occupied volume of the component(s) therein may vary greatly, depending on a number of factors, e.g., such as the viscosity of the component(s) to be placed therein, the fitment size, the appropriate amount of the component(s) therein in each dispensed beverage product, and the relative ratio of the components in each of the compartments. In one embodiment, the compartment capacities and occupied volumes may be between about 50 mL and 10 L, preferably between about 100 mL and 5 L, more preferably between about 200 mL and 4 L. The occupied volume of each compartment is typically less than the compartment capacity, although they may also be substantially the same.

The size of the orifice of the fitment of each compartment according to the invention depends on factors such as the viscosity, desired flow rate, and amount of the component(s) therein, as well as the relative ratio of the components in each of the compartments.

The relative ratio of the components in each of the compartments may also vary greatly, depending on the nature of the beverage product. When only two compartments are present in the packaging assembly, it is preferable that the relative ratio of the component(s) in the two compartments is from about 20:1 to 1:20, preferably from about 10:1 to 1:10, more preferably from about 5:1 to 1:5.

The volumetric flow rates of the components in each compartment may vary greatly, depending on any of the previously stated conditions or properties, such as those indicated above. In a preferred embodiment, each volumetric flow rate is from about 1 mL/min to 100 mL/min, preferably from about 5 mL/min to 50 mL/min, more preferably about 20 mL/min to 35 mL/min.

Optionally, the dispensation system may include a piping system that connects some or all of the different elements of the dispensation system. This piping system includes any suitable type of piping or tubing, typically those made of flexible polymeric materials, for contacting and dispensing consumable beverages. Examples of suitable piping include food grade plastics, such as PTFE, PE, HDPE, PP, PVC, silicones, and the like. For example, TYGON® and NOR-PRENE® are two types of tubing that could be used.

Optionally, especially when the at least two components are viscous or semi-viscous liquids or concentrates, the dispensation system according to the invention may also include a means for providing a diluent for the liquids or concentrates. This diluent may be any consumable liquid, including, but not limited to, water (hot, cold, or tepid, preferably hot), carbonated water (including seltzer or club soda), a milk or non-dairy milk-type product, a solution containing any of these, or any mixture thereof. It should be understood that when the diluent is susceptible to bacterial contamination, for example, when a milk product is used as a diluent, the dispensation system should include provision for inhibiting or preventing such contamination, e.g., such as sterile piping.

The means for providing a diluent in the dispensation system according to the invention may be any suitable means, but should include a diluent container and a mechanism for providing the diluent to the at least two components upon or prior to dispensation. The diluent may be provided by any suitable method known in the art, e.g., such as the aforementioned piping detailed herein, and may be controlled, for example, using a manual or mechanically activatable valve or using a pump mechanism. In some cases, the pumping mechanism may already be included in the pumping system of the dispensation according to the invention, especially if the pump assembly includes a multi-head pump. Alternately, the mechanism for pumping may include any pump assembly and/or any piping system stated above for use in the dispensation system according to the invention. If the diluent to be provided must be kept at a particular temperature, a heating or cooling unit or both, as well as a means for monitoring and/or controlling the temperature within the diluent container may be present in the dispensation system according to the invention.

In a preferred embodiment, the present invention provides a beverage system for providing a coffee beverage, the beverage system comprising a container including a first storage compartment containing a coffee base concentrate having a soluble coffee solids concentration of at least 10% by weight and from which coffee aroma has been removed, and a second storage compartment containing coffee aroma.

For food service applications, the coffee base concentrate and the coffee aroma may be separately stored in suitable dispenser containers. The containers may be separate for the coffee base concentrate and the coffee aroma or a single container having separate storage chambers may be used. The containers can advantageously be pouches made from, for example, barrier films which are able to keep water vapor, oxygen, and light transmission to a minimum. Suitable barrier films are commercially available, for example, containing laminated layers of polyester/aluminum/polyethylene, or the like.

For retail applications of coffee-based beverages, the two components are preferably packaged in suitable containers which have separate storage chambers for the coffee base concentrate and the coffee aroma. Suitable containers include multi-compartment stick packs; sachets; carton-based, tetrahedron packs; UNIFILL packs; squeezable plastic bottles; stand up pouches; plastic cups; etc. The containers are preferably designed such that opening of the container opens both chambers such that both the coffee base concentrate and the coffee aroma are simultaneously available for reconstitution of the beverage.

One aspect of this invention is based upon the finding that the separate storage of concentrated soluble coffee solids and coffee aroma significantly improves the stability of the concentrated soluble coffee solids. Therefore, by separately storing the coffee base concentrate and coffee aroma and recombining them upon reconstitution, a coffee beverage of good quality may be provided.

The coffee base concentrate may be obtained using any suitable procedure since the exact procedure used is not critical. Usually, the coffee base concentrate is prepared by concentrating a coffee extract obtained from a coffee extraction process to the desired coffee concentration. The coffee extract may be produced in the usual manner by subjecting roasted coffee beans to extraction. Any suitable extraction procedure may be used because the choice and design of the extraction procedure is a matter of preference and has no critical impact on the invention. Suitable extraction procedures are described in U.S. Pat. Nos. 5,997,929 and 5,897,903, the disclosures of which are incorporated by reference.

Similarly, any suitable concentration procedure may be used because the choice and design of the concentration procedure is a matter of preference and has no critical impact on the invention. Of course, the coffee base concentrate may also be prepared by dissolving soluble coffee powder in water to the desired concentration.

The concentration of the coffee base concentrate is at least about 10% by weight, for example at least 30% by weight. Preferably the concentration is high enough such that the concentrate will not support the growth of microorganism, for example about 50% to about 65% by weight. The concentration may be more than 65% by weight but then dispensing becomes more difficult due to increasing viscosity.

The coffee base concentrate may be treated to account for or reduce the formation of acids during storage. To account for the formation of acids during storage, the pH of the coffee base concentrate may be raised about 0.5 to 1.0 unit higher than original pH. The pH will still fall during storage but the coffee base concentrate will not become too acidic during acceptable shelf life times. The pH may be raised using any suitable procedure. For example, an alkali may be added to the coffee base concentrate to raise the pH. Suitable alkalis include sodium hydroxide, calcium hydroxide, potassium hydroxide and sodium bicarbonate.

Alternatively, the pH may be raised using ion exchange process with an ion exchange resins. This offers the advantage that the no additives are added to the coffee base concentrate. Alternatively, a combination of adding alkali and ion exchange can of course be performed. It is preferred that the coffee base concentrate is obtained from extract subjected to ion exchange treatment to raise pH.

It may be advantageous to store coffee base concentrate in a refrigerated or frozen condition, preferably frozen. This has the advantage that the stability of coffee base concentrate may be improved.

The formation of acids may be reduced or prevented by inducing hydrolysis of the acid precursors in the coffee base concentrate. This may be done by raising the pH to cause the acid precursors to form stable salts and then reducing the pH of the concentrate. This may be done by adding alkali as described in European patent application 0861596 or by using ion exchange. Usually the pH will be raised to above about 9. The pH may again be lowered to a normal coffee pH range using suitable acids or ion exchange. Alternatively, the acid precursors may be thermally hydrolyzed or enzymatically hydrolyzed, for example by using an esterase.

The formation of acids may also be reduced or prevented by removing acid precursors from the coffee base concentrate using membrane fractionation process. It is preferred that the coffee base concentrate is obtained from extract subjected to membrane fractionation. Suitable membranes are commercially available.

It is also possible to add an alkali to the base coffee concentrate at the time of reconstitution of the beverage. This may be done by dispensing an alkali along with the base coffee concentrate.

The coffee base concentrate should be substantially free of coffee aroma. Processing the roasted coffee beans to a coffee base concentrate, as described above, will result in the loss of substantially all coffee aroma from the coffee base concentrate. However, it is preferred to specifically strip off and then collect the coffee aroma during processing. In this way, the coffee aroma is separated from the concentrate but is not lost. Processes for stripping off and collecting the coffee aroma are well known. Usually coffee aroma is stripped off at one or more stages; for example using an inert gas during, or immediately after, grinding of the coffee beans, and using steam to strip coffee aroma from the coffee extract during extraction.

Alternatively, the fresh coffee grounds may be slurried in water or coffee extract and the coffee aroma stripped from the slurry. A suitable procedure is described in U.S. application Ser. No. 09/057,741, the disclosure of which is incorporated by reference.

The coffee aroma may be captured using any suitable procedure. Ordinarily, the coffee aroma is captured by condensing from the carrier gas it in one or more condensers. Preferably more than one condenser is used; each succeeding condenser being operated at a lower temperature than the previous condenser. If necessary or desired, one of the condensers may be a cryogenic aroma condenser. A suitable cryogenic aroma condenser is described in U.S. Pat. No. 5,182,926, the disclosure of which is incorporated by reference. The captured coffee aroma may, if desired, be concentrated using a suitable technique such as partial condensation or rectification.

The captured coffee aroma may be combined with a suitable carrier substrate such as coffee oil or an emulsion containing coffee oil.

The processes for the production of the coffee extract and capture of the coffee aroma may be carried out under oxygen reduced or oxygen free conditions if desired. This may be accomplished as is known in the art; for example by carrying out the processes under a blanket of inert gas. Further, deoxygenated water may be used whenever water is necessary in the process.

The coffee aroma is preferably stored under oxygen reduced or oxygen free conditions. Similarly, the coffee base concentrate may stored under oxygen reduced or oxygen free conditions. Further, if desired, oxygen scavengers may be added to the coffee aroma and/or coffee base concentrate. Suitable oxygen scavengers are described in U.S. application Ser. No. 09/018,566, the disclosure of which is incorporated by reference. If further desired, coffee aroma can be stored under refrigerated or frozen condition. This has the advantage that the stability of the aroma may be improved.

The dispensation system according to the invention may also optionally include other components that may provide some functional or aesthetic benefit. Among the optional components include a control system, a switch board, a dispenser housing, a drip pan, a hot or cold water tap, and a frame on which one or more of the elements of the dispenser system according to the invention may rest or be attached or supported.

Another aspect of the present invention involves a method for dispensing a beverage containing at least two components, preferably viscous or semi-viscous liquids or concentrates, which method includes: storing the at least two components separately in a single packaging assembly; combining the at least two components together, optionally, along with a diluent to form a consumable beverage; and dispensing the consumable beverage for consumption by a consumer, wherein at least one of the at least two components being stored in a compartment separate from at least one other of the at least two components.

In one preferred embodiment, shown in FIG. 1, the dispensation system contains a dual container 2; a pump assembly 17, containing a peristaltic pump housing 6 and a pump motor 16; an addition chamber 12 having three inlets, two for the piping, 4a and 4b, from each of the two components, and one for the piping 18 leading to the diluent tank 11; a connector assembly 19, having dual glands, 1a and 1b, for connecting to the fitments on the outer container 2; and a dispenser frame 20, including a housing 8 and a door 9.

Figure 2:
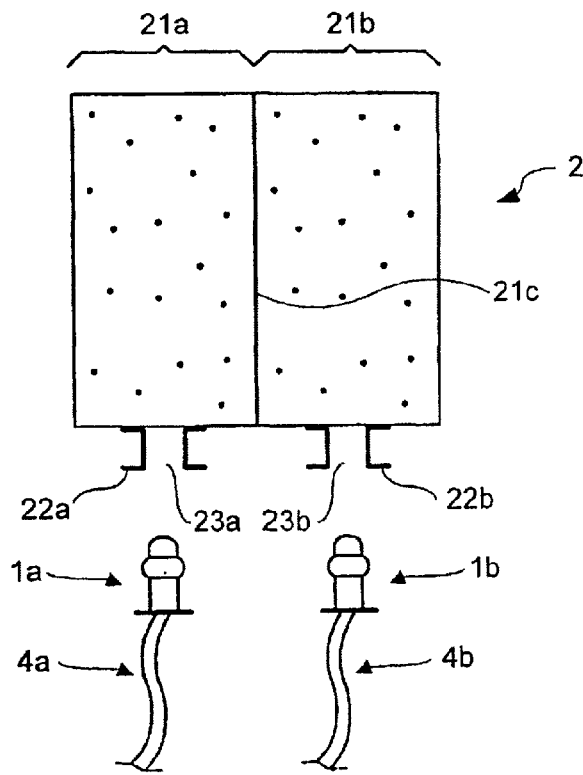
FIG. 2 shows a diagrammatic view of a preferred dual packaging assembly and coupling elements for connecting to the dispensation system.

Preferably, the dual container shown in FIG. 2 includes two component pouches, 21a and 21b, which are connected by two webs of film heatsealed together along a sealing line 21c substantially along the median of the webs. Alternately, instead of by heatsealing, the pouches could be adhesively secured together, for example, by any suitable adhesive or thermofusible intermediate film or hot melt material. Each component pouch includes a female pouch fitment, 22a and 22b, which advantageously protrudes outside the pouch surface and forms an orifice, 23a and 23b, of a size depending upon, among other things, the viscosity and required dispensing ratios of the components. Each fitment is configured to be securable to one gland, 1a or 1b, preferably by "push-and-lock" assembly, to enable flow from both pouches through portions of respective connecting tubes or pipes, 4a and 4b, connected to the glands, 1a and 1b. Externally, the dual container may be treated as one single packaging assembly. The packaging assembly can be placed in the dispensation system very conveniently to allow dispensation of the components to form a beverage product. In an alternative embodiment (not shown), the two pouches could fold over, preferably substantially at the median or at the heatseal, so that the two fitments are situated coaxially, thus allowing connection to a single dispensing gland to enable flow therefrom.

Figure 3:
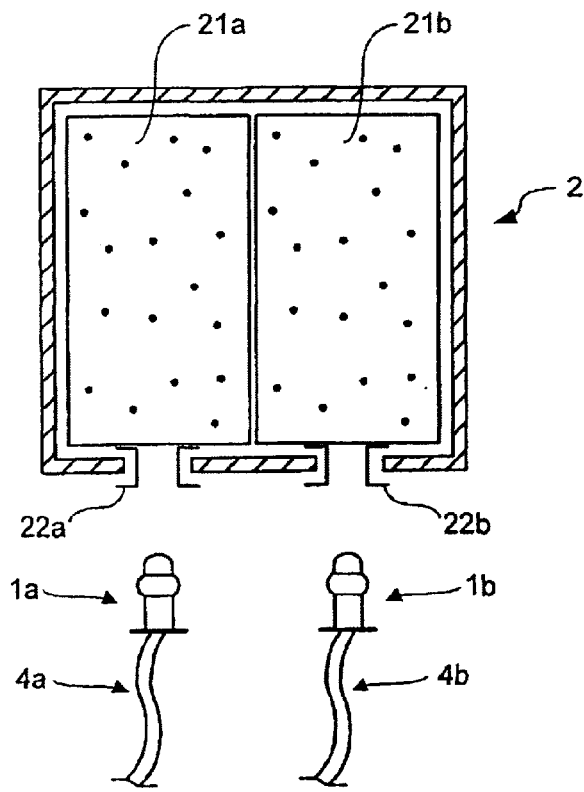
FIG. 3 shows another embodiment of the invention in which the dual packaging assembly has an outer container distinct from the inner compartments containing the components.

Alternatively, as shown in FIG. 3, the component pouches, 21a and 21b, are stored as two separate members in a single container 2. Each component pouch has a female pouch fitment, 22a and 22b. These pouch fitments, 22a and 22b, can connect to the dual glands, 1a and 1b, preferably with a quick-disconnect type release mechanism.

The fluid flow couplings may preferably include those of the "dry break" type, for example, such as those disclosed in U.S. Pat. Nos. 5,609,195, 5,467,806, and 5,816,298. More particularly, the fluid flow couplings refer to a connection between a first, male part and a second, female part, through which connection fluid may flow. When the couplings parts are disconnected, they mutually reseal to prevent loss of fluid from either tubing(s) or container(s). Additionally, the "dry break" aspect of these couplings implies a desirably minimal fluid retention volume, so that fluid is not sealed in either the first or second coupling parts, thus minimizing exposure to, or release into, ambient conditions.

The term "about," as used herein with respect to a range of values, should be understood to modify either value stated in the range, or both.

EXAMPLES

The following examples are only representative of the methods and materials for use in dispensation systems according to the invention or any element(s) thereof, and are not to be construed as limiting the scope of the invention in any way.

Example 1

Roast and ground coffee was fed into a slurry tank along with a coffee extract containing about 8 to 10% by weight of soluble coffee solids. The resulting slurry was fed to the top of a disc and donut stripping column using a slurry pump. Steam at a low pressure of less than about 20 kpa (gauge) was fed into the bottom of the stripping column. The stripping rate was 50% by weight of steam compared to roast and ground coffee.

The aromatized gas stream leaving the stripping column was subjected to concentration by rectification in a packed rectification column. The liquid condensing in the rectification condenser was collected and comprises about 10% by weight of the roast and ground coffee. The coffee aroma was placed in glass vials and protected from oxygen.

The stripped slurry leaving the stripping column was then subjected to extraction in a continuous extraction system made up of three extraction reactors and two solubilization reactors. The system is as described in U.S. Pat. No. 5,897,903, which has been incorporated by reference. The extraction reactors are operated at 120° C., 110° C., and 110° C., respectively. The solubilization reactors are operated at 1.75 MPa for 5 minutes and 1.75 MPa for 8 minutes respectively. The water used in the extraction system was deoxygenated and an inert blank was used with the system to reduce oxygen ingress.

The extract obtained is called stripped extract. This stripped extract was further concentrated using a evaporation system to provide a coffee base concentrate containing about 55% by weight of soluble coffee solids. About 0.75% to 1% of sodium hydroxide (by weight relative to coffee solids) was added to the coffee base concentrate. This amount of Sodium hydroxide was sufficient to neutralize acid formation over a period of 6 months. The coffee base concentrate was then filled in glass vials and held under inert gas conditions.

Three sample groups were prepared for storage. For the control group, coffee base concentrate was combined with coffee aroma at a level of about 10% coffee aroma and frozen at −40° C. The coffee base concentrate and coffee aroma were protected from oxygen during the process.

The prior art formulation was made by combining coffee base concentrate with coffee aroma at a level of about 10% coffee aroma and filled into glass vials. The coffee base concentrate and coffee aroma were protected from oxygen during the process.

For Example 1, the coffee base concentrate and coffee aroma were separately stored in the glass vials. The vials of the prior art formulation and Example 1 were stored at 20° C. under an inert gas for up to 6 months.

A coffee beverage was prepared from each sample group over the period of the storage trial and evaluated by a panel using the "Difference from Control" sensory evaluation method. When preparing beverages of Example 1, about 10% by weight coffee aroma was added to the base coffee concentrate. Each of the storage samples was evaluated against to the frozen control. Each panelist gives a score between 1 and 10 to indicated the degree of difference. If the score is 9 and 10, this means that the panelist could not tell the storage sample as being different from frozen control. If the score is between 6 to 8, a difference from frozen control is detected but the difference is acceptable. If the score is below 6, the difference between the storage sample and the frozen control is not acceptable. If a score below 9 is given, each panelist is asked to describe the differences under the following attributes: cloudiness, coffeeness, roastyness, pruneyness/molasses, acidity, bitterness and body. Panelists are also free to use other attributes to describe the differences. At the end of evaluation, the panel give a consensus score for the samples being evaluated.

The beverages prepared from the samples of Example 1 scored values of 6 to 8 during the trial. After six month storage, the differences are (1) less coffeeness, (2) less roastyness and (3) some development of green, woody characteristics. However, the differences are acceptable. The beverages prepared from the prior art formulation scored values of less than 6 and were not acceptable.

Example 2

The process of Example 1 was repeated except that, instead of adding sodium hydroxide to the coffee base concentrate, the stripped extract was subjected to membrane fractionation process, specifically ultra-filtration, using a membrane with a 3.5K molecular cut off such that about 25% of coffee solids was removed in the permeate. It is preferred to membrane fractionate the stripped extract to prevent loss of aroma during processing. And then the retentate was further evaporated to form coffee base concentrate. The coffee base concentrate and coffee aroma were separately stored in the glass vials. The beverages prepared from the coffee base concentrate and coffee aroma of Example 2 scored values of 6 to 8 during the trial.

Example 3

The process of Example 1 was repeated except that, instead of adding Sodium hydroxide to the coffee base concentrate, the stripped extract was passed through an ion exchange column containing DOWEX 22 resins to raise the pH to a value equivalent to the addition of 1% sodium hydroxide (by weight relative to coffee solid). It is preferred to use stripped extract to minimize the damage of coffee aroma during processing. The treated stripped extract was further evaporated to form coffee base concentrate. The coffee base concentrate and coffee aroma were separately stored in the glass vials. The beverages prepared from the coffee base concentrate and coffee aroma scored values of 6 to 8 during the trial.

Example 4

The process of Example 1 was repeated except that the coffee aroma was stored under frozen condition. The beverages prepared from the coffee base concentrate and the frozen stored coffee aroma scored values of 6 to 8 during the trial.

Example 5

The coffee base concentrate and the coffee aroma of Example 1 were each inoculated with a microbial cocktail containing 32 yeast, 22 mold and 15 lactic acid bacteria strains. The samples were stored at 20° C. No growth was detected and all organisms had ceased to be viable after two weeks or longer.

Example 6

A packaging assembly according to the invention contains two compartments, A and B, each with a compartment capacity of slightly greater than 1 liter and each possessing an attached fitment with an orifice having a diameter of about 4 mm. In compartment A is a coffee concentrate having a viscosity between about 1,000 cPs and 5,000 cPs. In compartment B is a coffee aroma distillate having a viscosity of about 1 cPs. In this case, the relative ratio of the coffee concentrate to the coffee aroma in the beverage product is about 1:1.

Example 7

A dispensation system according to the invention contains the packaging assembly of Example 6, as well as connecting glands, a dual head pump assembly, mixing chamber, diluent tank, and connective tubing.

Example 8

A beverage product provided by the dispensation system of Example 7 can advantageously be dispensed according to a method of the invention. As such, the two components are pumped at a predetermined flow rate of about 30 mL/min into a mixing chamber of the dispensation system, in which they are mixed together and diluted with about 170 mL of hot water (temperature of about 70° C. to 90° C.). The resulting mixture is then dispensed for consumption.

While the foregoing description represents the preferred embodiments of the present invention, it will be understood that various additions and/or substitutions may be made therein without departing from the spirit and scope of the present invention. One skilled in the art will appreciate that the invention may be used with many modifications of structure, forms, arrangement, proportions, materials, and components used in the practice of the invention and which are particularly adapted to specific environments and operative requirements, without departing from the principles of the present invention. The presently disclosed embodiments are therefore to be considered in all respects as illustrative and not restrictive.

What is claimed is:

1. A method for automatically preparing and dispensing a beverage product containing at least two different components, which method comprises:

providing and retaining at least two different components in separate compartments of a single packaging assembly, wherein the components are capable of forming a beverage after being combined;

pumping the at least two different components from the separate compartments of the packaging assembly at a predetermined rate suitable for combining the at least two different components and to withdraw them from the compartments in a uniform manner relative to each other;

combining the at least two pumped components by withdrawing them from the packaging assembly and mixing them together, optionally with a diluent, in relative amounts to form a consumable beverage product; and dispensing the consumable beverage product for consumption by a consumer.

2. The method of claim 1, wherein the components have different viscosities, and wherein a diluent having a viscosity is combined with the components, with at least one of the components having a viscosity that is greater than double that of the diluent.

3. The method of claim 1, wherein the diluent comprises water, carbonated water, a milk or non-dairy milk product, a solution containing any of these, or a mixture thereof.

4. A method for improving quality of a dispensed coffee beverage containing at least two different components from a dispensation system, which method comprises:

providing and retaining at least two different components in separate compartments of a single removable packaging assembly of the dispensation system, wherein the components are capable of forming a coffee beverage after being combined;

pumping the at least two different components from the separate compartments of the packaging assembly and combining the at least two components by mixing them together, optionally with a diluent, in relative amounts to form a consumable beverage product; and dispensing the consumable beverage product for consumption by a consumer.

5. The method of claim 4 wherein the at least two different components are pumped from the separate compartments of the packaging assembly at a predetermined rate suitable for combining the at least two different components and to withdraw them from the compartments in a uniform manner relative to each other at substantially the same time.

6. The method of claim 4, wherein the packaging assembly is a single chamber of a polymer film that is divided to form the compartments.

7. The method of claim 4, wherein one component is a coffee base concentrate that is substantially free of coffee aroma, and another component is a coffee aroma.

8. The method of claim 4, wherein handling and loading of the at least two components into the dispensation system is facilitated by providing compartments that are separated but secured together, each compartment comprising a fitment adapted to connect to a complementary gland of the dispensation system.

9. The method of claim 8, wherein the at least two compartments are secured together by heatsealing or using an adhesive.

10. The method of claim 8, wherein the at least two compartments are secured together within a single outer container.

11. A method for dispensing a beverage product containing at least two different components, which method comprises:

providing and retaining at least two different components in separate compartments of a single packaging assembly, wherein the components are capable of forming a beverage after being combined and the compartments contain relative amounts of each component, such that each compartment empties uniformly relative to the other compartment(s) at a determined rate;

combining the at least two components by withdrawing them from the packaging assembly and mixing them together, optionally with a diluent, in an addition chamber operatively associated with the compartments of the packaging assembly to form a mixture; and dispensing the mixture as a beverage product or beverage-forming product for consumption by a consumer using a pump assembly associated with the addition chamber.

12. The method of claim 11 wherein the system includes means for providing a diluent to the mixture of the least two components to provide a diluted beverage product.

13. The method of claim 12, wherein the means for providing a diluent comprises a diluent tank filled with one of water, carbonated water, a milk or non-dairy milk product, a solution containing any of these, or a mixture thereof.

14. The method of claim 13, wherein the diluent tank is filled with water or an aqueous solution so that the beverage product that is dispensed is a non-carbonated beverage, a coffee or tea beverage, or a creamy beverage.

15. The method of claim 11, wherein the beverage is dispensed through a pump assembly that comprises dual-head or multi-head volumetric positive displacement pumps.

16. The method of claim 15, wherein the volumetric positive displacement pumps are peristaltic pumps.

17. The method of claim 11, wherein the packaging assembly includes dual compartments for retaining the components therein.

18. The method of claim 11, wherein the packaging assembly is a single chamber of a polymer film that is divided to form the compartments.

19. The method of claim 18, wherein each compartment includes a fitment to dispense the components from the compartments.

20. The method of claim 11 wherein the packaging assembly is made of a barrier polymer film that is processed to form separate gas-, liquid-, and light-hermetic compartments.

* * * * *

UNITED STATES PATENT AND TRADEMARK OFFICE
CERTIFICATE OF CORRECTION

PATENT NO. : 6,756,069 B2
DATED : June 29, 2004
INVENTOR(S) : Scoville et al.

It is certified that error appears in the above-identified patent and that said Letters Patent is hereby corrected as shown below:

Title page,
Item [60], Related U.S. Application Data, change the provisional application no. from "60/134,460" to -- 60/134, 640 -- and change the filing date from "May 17, 1999" to -- May 18, 1999 --.

Column 1,
Line 9, change the provisional application no. from "60/134,460" to -- 60/134,640 -- and change the filing date from "May 17, 1999" to -- May 18, 1999 --.

Column 14,
Line 49, change "claim 1" to -- claim 2 --.

Signed and Sealed this

Seventh Day of June, 2005

JON W. DUDAS
*Director of the United States Patent and Trademark Office*